(12) United States Patent
Nanavati et al.

(10) Patent No.: US 10,180,939 B2
(45) Date of Patent: Jan. 15, 2019

(54) EMOTIONAL AND PERSONALITY ANALYSIS OF CHARACTERS AND THEIR INTERRELATIONSHIPS

(71) Applicant: International Business Machines Corporation, Armonk, NY (US)

(72) Inventors: Amit Anil Nanavati, New Delhi (IN); Nitendra Rajput, Grugaon (IN); Mayur Saxena, Lucknow (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/341,682

(22) Filed: Nov. 2, 2016

(65) Prior Publication Data
US 2018/0121414 A1    May 3, 2018

(51) Int. Cl.
*G06F 17/00* (2006.01)
*G06F 17/27* (2006.01)
*G06T 11/20* (2006.01)
*G06F 17/30* (2006.01)

(52) U.S. Cl.
CPC ...... *G06F 17/279* (2013.01); *G06F 17/30684* (2013.01); *G06F 17/30958* (2013.01); *G06T 11/206* (2013.01)

(58) Field of Classification Search
CPC ....... G06F 17/279; G06F 17/278; G06F 17/27
See application file for complete search history.

(56) References Cited

U.S. PATENT DOCUMENTS

| 2010/0146118 A1* | 6/2010 | Wie ............. H04L 67/306 709/225 |
| 2012/0263433 A1 | 10/2012 | Mei et al. |
| 2016/0117311 A1* | 4/2016 | Maetz ............. G06F 17/278 704/9 |

OTHER PUBLICATIONS

T. Antal et al., "Social balance on networks: The dynamics of friendship and enmity", ScienceDirect, Physica D, 2006, 7 pages, Elsevier B.V.
Chung-Yi Weng et al., "RoleNet: Movie Analysis from the Perspective of Social Networks", IEEE Transactions on Multimedia, Feb. 2009, 16 pages, vol. 11, No. 2, IEEE Digital Library.

(Continued)

*Primary Examiner* — Shreyans A Patel
(74) *Attorney, Agent, or Firm* — Ference & Associates LLC

(57) ABSTRACT

One embodiment provides a method, including: utilizing a processor to execute computer code that performs the steps of: receiving, at an information handling device, a dataset comprising dialog information between a plurality of characters in a narrative; analyzing, using the processor, the dataset to identify dialog patterns between the plurality of characters; determining, based upon the identified dialog patterns, at least one relationship profile between at least a subset of the plurality of characters; and generating, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters. Other aspects are described and claimed.

15 Claims, 6 Drawing Sheets

(56) References Cited

OTHER PUBLICATIONS

Lei Ding et al., "Learning Relations among Movie Characters: A Social Network Perspective", ECCV 2010, Part IV, LNCS 6314, 14 pages, Springer-Verlag Berlin Heidelberg.
Timothee Cour et al., "Movie/Script: Alignment and Parsing of Video and Text Transcription", 10th European Conference on Computer Vision, Computer Vision—ECCV 2008, Oct. 1, 2008, 16 pages, Springer Link.
Apoorv Agarwal et al., "Parsing Screenplays for Extracting Social Networks from Movies", Proceedings of the 3rd Workshop on Computational Linguistics for Literature, Apr. 27, 2014, Gothenburg, Sweden, 9 pages, Association for Computational Linguistics.

\* cited by examiner

EMOTIONAL AND PERSONALITY ANALYSIS OF CHARACTERS AND THEIR INTERRELATIONSHIPS

BACKGROUND

A screenplay, or script, is a written work that governs the movement, actions, expressions, and dialogue of characters in a narrative. Scripts exist for a variety of different productions such as movies, plays, television shows, advertisements, and the like. The script is used to identify a character's personality, emotions, and the like. The dialogue and interactions between characters provide different viewpoints and tones for the narrative. For example, a dialogue line said with a particular inflection can provide a completely different tone and overall feel for the narrative than if the same dialogue line is said with a different inflection. Thus, it is important for actors, writers, directors, and the like, to understand the character's personalities and emotions, as well as their relationships with other characters, and the changes over a period of the narrative in order to effectively analyze and communicate the narrative and desired tone to a viewing audience.

BRIEF SUMMARY

In summary, one aspect of the invention provides a method, comprising: utilizing a processor to execute computer code that performs the steps of: receiving, at an information handling device, a dataset comprising dialogue information between a plurality of characters in a narrative; analyzing, using the processor, the dataset to identify dialogue patterns between the plurality of characters; determining, based upon the identified dialogue patterns, at least one relationship profile between at least a subset of the plurality of characters; and generating, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters.

Another aspect of the invention provides an apparatus, comprising: at least one processor; and a computer readable storage medium having computer readable program code embodied therewith and executable by the at least one processor, the computer readable program code comprising: computer readable program code that receives a dataset comprising dialogue information between a plurality of characters in a narrative; computer readable program code that analyzes, using the at least one processor, the data-set to identify dialogue patterns between the plurality of characters; computer readable program code that determines, based on the identified dialogue patterns, at least one relationship profile between at least a subset of the plurality of characters; and computer readable program code that generates, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters.

An additional aspect of the invention provides a computer program product, comprising: a computer readable storage medium having computer readable program code embodied therewith, the computer readable program code executable by a processor and comprising: computer readable program code that receives a dataset comprising dialogue information between a plurality of characters in a narrative; computer readable program code that analyzes, using the at least one processor, the data-set to identify dialogue patterns between the plurality of characters; computer readable program code that determines, based on the identified dialogue patterns, at least one relationship profile between at least a subset of the plurality of characters; and computer readable program code that generates, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters.

A further aspect of the invention provides a method, comprising: utilizing at least one processor to execute computer code that per forms the steps of: receiving, at an information handling device, a script comprising dialogue information between a plurality of characters in a narrative; analyzing, using the processor, the script to identify dialogue patterns between the plurality of characters; determining, based upon the identified dialogue patterns, at least one relationship profile between at least a subset of the plurality of characters, wherein the relationship profile is selected from the group consisting of an emotional profile and a personality profile; and generating, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters; wherein the at least on graph comprises at least two different groups, wherein each group comprises nodes and edges having characteristics, obtained from the relationship profile, similar to the other nodes and edges of the same group.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
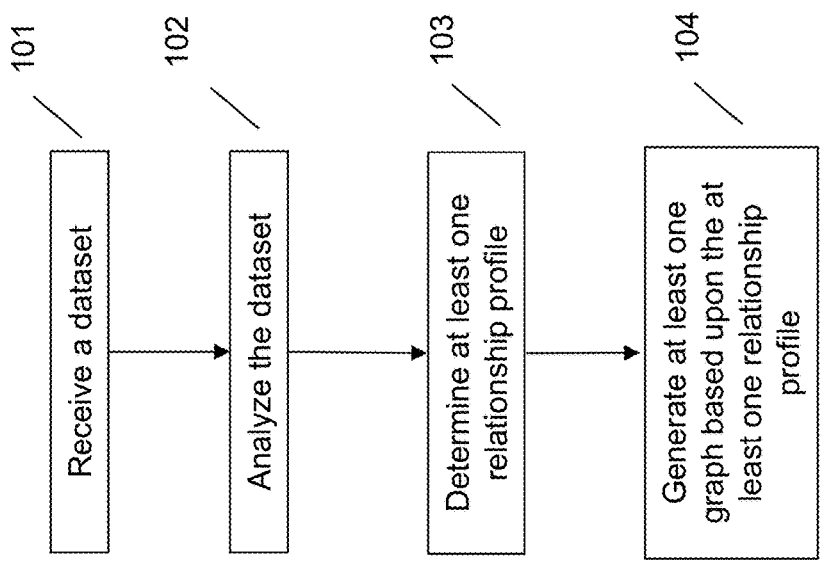
FIG. 1 illustrates a method of generating a graph from a received dataset.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 6, whether on a server computer, a client computer, a node computer in a distributed network, or any combination thereof.

Scripts (e.g., movie scripts, play scripts, television scripts, etc.) often have complex narratives that may be difficult to comprehend in a single reading. For example, a script for a movie may contain an assortment of different characters who exchange numerous, and possibly complex, lines of dialogue with other characters in varying settings. The relationships between these characters and the underlying reasons for the type of dialogue exchanged may not be readily apparent even after multiple readings of the script. Additionally, character emotions and relationships with other characters may evolve and change throughout the narrative or script. For example, in a romantic film, two characters may dislike each other at the beginning of the film but may love each other at the end. The changes in the relationships and attitudes towards other characters may be difficult to identify and follow. Additionally, the reasons for the change in the relationships and attitudes may be difficult to determine from a cursory reading of the script.

The conventional approach to understanding scripts and the relationships between characters within the script is to read the scripts several times. Upon close reading, a reader may be able to grasp the subtleties of the relationships between the characters in the narrative. However, multiple readings are time consuming and burdensome. If the narrative is especially complex (e.g., the narrative takes place over many years, involves numerous characters and settings, etc.), even through multiple readings of the script, a reader may still be unable to recognize the reasons for a character's behavior, the nuances of a relationship between two characters, and the like.

Furthermore, scripts are typically written in a specialized format (e.g., scripts have specialized rules for fonts, indentations, capitalizations, etc.) that is different than that of a conventional book. This specialized format may make it difficult for individuals who are unfamiliar with the writing style, to read the script efficiently and understand the nuances of the script. Additionally, individuals who study scripts (e.g., film and theater students, playwrights, movie enthusiasts, etc.), may desire a more effective way to analyze and compare them. For example, individuals may want a deeper understanding as to how a remake of an older film is similar to or different from the original. In another example, individuals may want to know what elements impact the pace of a movie and how these elements are reflected in the script.

Accordingly, an embodiment provides a method of analyzing datasets (e.g., scripts, narratives, etc.) to generate graphs that illustrate relationships between characters. In an embodiment a graph may contain a plurality of edges and nodes. Each node may correspond to a character in the narrative and each edge may correspond to dialogue or relationship between two characters. In an embodiment each edge may contain a label that describes a relationship between two characters (e.g., happy, angry, fearful, etc.). For ease of understanding, the term "a character" is used throughout. However, it should be understood by one skilled in the art that "a character" does not necessarily refer to a single character. Rather "a character" may include a group of characters.

In an embodiment, a single graph may be generated that illustrates the overall relationship between characters in a narrative. Additionally or alternatively, a series of graphs may be generated. Each of the graphs may illustrate a relationship between characters at specific times throughout the narrative. For example, three different graphs may be generated with each graph representing a third of a movie and the relationship between the characters for that part of the movie. Using the series of graphs may assist an individual in visualizing the evolution of relationships between characters as the narrative progresses.

In an embodiment, a graph may be generated based upon a relationship profile (e.g., conversation profile, emotional profile, personality profile, etc.). Graphs generated based on a relationship profile may result in a graph where the nodes and edges are organized into groups. Each of the groups may contain nodes and edges that represent characters and relationships sharing the same relationship characteristics. In one embodiment the different groups may be represented by different colors. In an embodiment, the generated graphs may be further analyzed to identify relationship or dialogue diagrams. Text templates may be generated from these diagrams and may describe, in sentence form, the relationships between characters or groups of characters.

Such a system provides a technical improvement over current systems for identifying the dialogue and relationships between characters in a narrative. The system and methods as described herein provide a tool for identifying not only the relationships between characters at a certain point, but also the evolution of the relationships over the course of the script. The system provides a way to accurately and quickly identify a relationship and tone of the script at a particular point in the script, which may be a useful visual tool for screenwriters, directors, actors, students, and the like. As an example, based upon the analysis performed by the systems and methods described herein, a screenwriter may identify a point in the script which does not convey the tone the screenwriter desired. Thus, the screenwriter may choose to diminish, enhance, modify, and the like, various aspects of the narrative based on the generated graphs. In another example, using this system, actors can get a much deeper understanding of their roles and the changes in the emotions and relationships of their characters. Additionally, because the ability to generate the graphs is not dependent on video analysis, the system can be useful during the movie creation phase rather than requiring a fully developed visual representation of the script.

Referring now to FIG. 1, an embodiment may generate a visual representation of relationships between characters in a narrative. At 101, an embodiment may receive a dataset comprising dialogue information. In an embodiment, the dataset may be a script (e.g. movie scripts, play scripts, television scripts, etc.) or other document that contains interactions (e.g., dialogue, silent interactions, etc.) between characters in a narrative. Dialogue information may include lines of script spoken by one character to another character. In an embodiment the dataset may contain additional data such as directorial elements, subtitles (e.g., character movements, location descriptions, actor tips, etc.), and the like.

At 102, an embodiment may analyze the dataset to identify dialogue patterns between characters. In an embodiment, language analysis tools, for example, text parsers, semantic analysis, and the like, may be used to identify different elements of the dialogue. For example, the language analysis tools may distinguish the character names and the dialogues corresponding to the character from the other elements of the dataset. For example, after a script is received (e.g., at an information handling device, etc.), text parsers may be used to analyze the dialogue to determine character names and the dialogue the characters exchange with other characters. The language analysis tools may also be used to identify the syntax and construction of the dialogue. Such analysis may assist in identifying the tone, conversational style, and the like, of the dialogue. This information can be further used to determine the attitude of one character towards another character, the personality of a character, the relationship between characters, the role of a character, and the like.

Based upon the identified dialogue patterns an embodiment may determine at least one relationship profile between some, or all, of the characters at 103. In an embodiment, the relationship profile may be a conversation profile, a personality profile, an emotional profile, a combination of profiles, and the like. These profiles may represent an association or relationship between groups of characters. For example, in a relationship profile based upon conversation, characters that exchange frequent lines of dialogue with one another throughout the script may be associated and may subsequently be grouped. In a relationship profile based upon personality, characters who share the same personality traits (e.g., characters that share a desire for peace, characters considered the antihero, etc.) may be associated and subsequently grouped. In a relationship profile based upon emotions, characters whose emotions change in unison (e.g., both characters are happy or sad at the same time, characters whose emotions are based upon the emotions of another character, etc.) may be associated and subsequently grouped.

The relationship profile may be dynamically determined by identifying words or phrases in the dialogue and associating those words with a trait. For example, in a relationship profile based upon personality or emotion, the words or phrases may be associated with a personality or emotional trait. For example, when one character says to another "I love you," the system may be able to identify, based on the short phrase, that there is an affectionate emotional relationship between the two characters. Thus, the system may identify that the emotional relationship between the characters is love and may associate the characters with each other. It should be understood, that a single word, phrase, or dialogue line may not be solely used to identify the relationship profile. Rather, the relationship profile may be generated over a series or section of script. Thus, if a character has a single dialogue line that is in contrast to the relationship profile that has been generated for the script section, the system may not drastically change the identified relationship profile. Additionally, the strength of a relationship, particularly the strength of a particular type of relationship, between two characters may be increased or decreased through the relationship analysis. Thus, as a relationship between two characters evolves and changes to a different type of relationship, the relationship profile may be modified accordingly.

Figure 2:
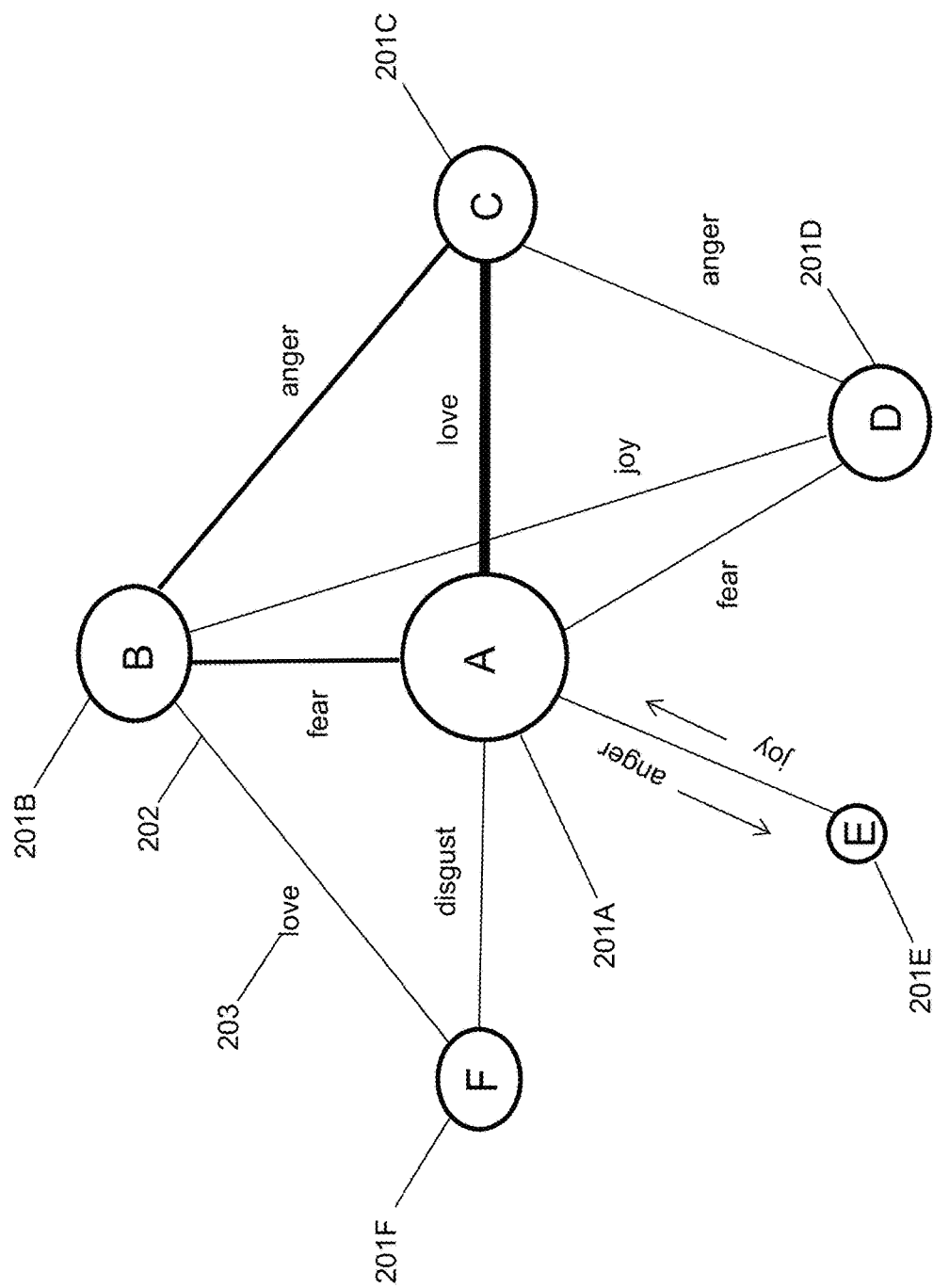
FIG. 2 illustrates an example graph showcasing the interrelationships between characters in a narrative.
Figure 3:
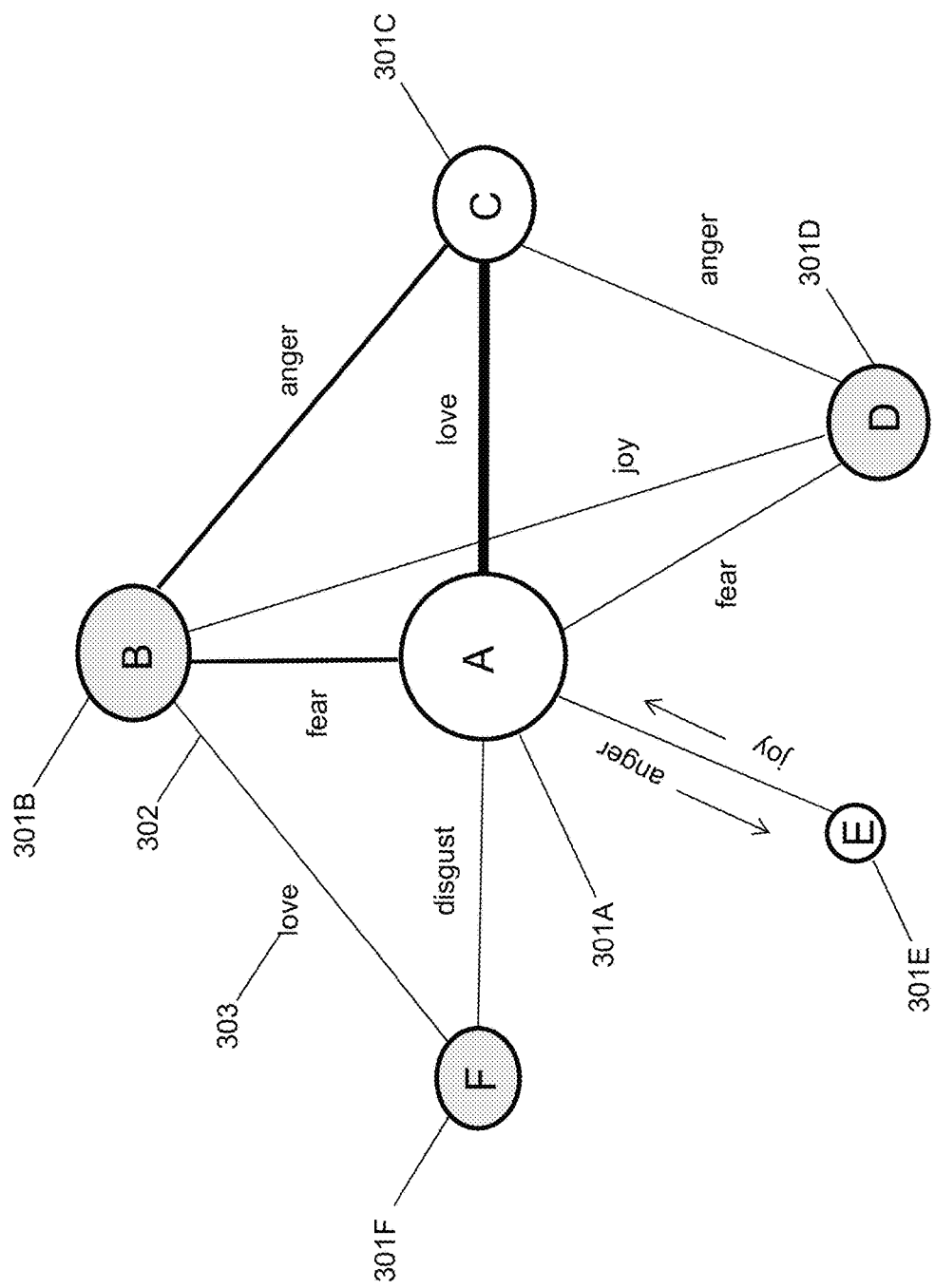
FIG. 3 illustrates an example grouping of characters in a graph based upon a relationship profile.

At 104, a graph may be generated based upon a determined relationship profile. In an embodiment, a graph, such as the one illustrated in FIG. 2, may contain a plurality of nodes 201A-201F and edges 202. Each node 201A-201F in the graph may correspond to an individual character or a related group of characters. Each edge 202 in the graph may correspond to lines of dialogue exchanged between two characters. Depending on the type of graph, the edge may additionally or alternatively represent a relationship between two characters. For example, in FIG. 2, it can be seen that character F 201F exchanges lines of dialogue with characters A 201A and B 201B due to the edge connecting these characters. However, the graph of FIG. 2 illustrates that character F 201F does not exchange lines of dialogue with character E 201E because there is no edge 202 between these nodes 201E and 201F. In an embodiment, the thickness of an edge 202 may be directly proportional to the conversation density between characters. For example, characters that exchange frequent lines of dialogue with each other may have a much thicker edge 202 than characters that only exchange one or two lines of dialogue with each other. For example, as shown in FIG. 2, character A 201A exchanges more lines of dialogue with C 201C than with D 201D as shown by the thicker edge 202 between A 201A and C 201C than the edge 202 between A 201A and D 201D.

In an embodiment, the size of the node 201A-201F may indicate how important a character is to the overall plot. In an embodiment, node size may be based on the number of different characters that a character exchanges dialogue with. For example, as shown in FIG. 2, character A 201A has the largest node because he exchanges dialogue with all five of the other characters in the narrative. Conversely, character E 201E has the smallest node size because he only exchanges dialogue with character A 201A. In an embodiment, node size may be based on the overall lines of dialogue a character exchanges with all of the other characters in the narrative. For example, a character that has 100 lines of total dialogue will have a larger node size than a character that has 50 lines of total dialogue. In an embodiment, the shape of the node 201A-201F may be selected from a variety of different shapes (e.g., circle, square, rectangle, etc.).

In an embodiment, relationship labels 203 may be included with the graph. These labels may describe the type of relationship between two characters at a given point in time. The relationship labels 203 may be single words (e.g., anger, fear, disgust, joy, etc.) or short groupings of words. In an embodiment, the relationship labels 203 may be positioned at a location near their corresponding edge 202 (e.g., directly above or below the edge, etc.), as shown in FIG. 2, positioned on the edge itself, and the like. In some situations, two characters may have differing views on their relationship. For example, a first character may feel happy for a second character while the second character simultaneously feels angry at the first character. In an embodiment, both of these relationships may be portrayed on the same edge by placing two relationship labels 203 on different sides of the edge 202, for example, as shown by the edge 202 between character A 201A and character E 201E. In an embodiment, each of these labels 204 may be followed by an arrow. The arrow may designate which character the label belongs to. For example, the character that the arrow points from may correspond to the relationship label for that character to the character the arrow is pointing towards.

Figure 4:
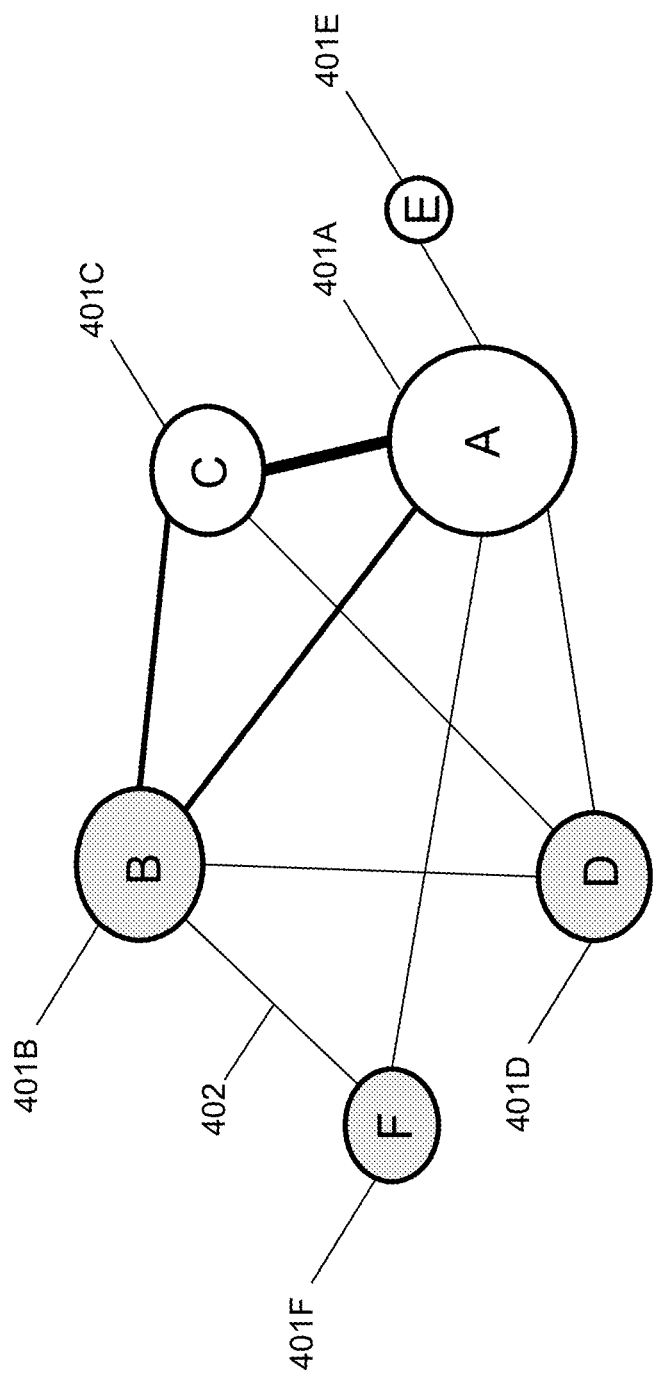
FIG. 4 illustrates an example grouping of characters in a graph based upon a relationship profile.

In an embodiment, the nodes and edges in the graph may be grouped according to the relationship profile that the graph was based upon. For example, the nodes and edges corresponding to characters and relationships having similar characteristics may be grouped together. These groupings may provide a better visual representation for the relationships between the characters. In an embodiment, the different groups may be illustrated in different ways (e.g., different colors, shadings, dash marks, etc.). For example, referring to FIG. 3, in an embodiment, a graph based upon a personality profile is shown. The graph contains the same characters that were illustrated in FIG. 2, however, characters B 301B, D 301D, and F 301F may all have been identified antagonists in the narrative and are grouped together. The grouping is illustrated by each of the nodes of the characters being similarly shaded, light grey in this example. In an embodiment, the graph may be depicted differently, for example, all members of a group may be positioned in close proximity to one another. For example, FIG. 4 shows the characters illustrated in FIGS. 2 and 3, but now all of the grouped characters are located in proximity to each other. As a note, the relationship labels are excluded in FIG. 4.

Over the course of a narrative, the relationship between characters may change. For example, at the beginning of a narrative, two characters may have a joyous relationship with one another. However, as the plot evolves, the relationship may sour and turn into anger. In an embodiment, multiple graphs may be generated and analyzed in order to provide a visual illustration of the evolution of relationships between the characters throughout the narrative. In an embodiment, each graph may correspond to a predefined time frame of the narrative. For example, for a movie that is sixty minutes long, the predefined time frame may be 10 minutes. Therefore, six graphs may be generated, where the first graph corresponds to the dialogue in the script associated with the first ten minutes of the movie, the second graph corresponds to the dialogue in the script associated with the second ten minutes of the movie, etc. In an embodiment, the predefined time frame may be set by a user. Alternatively, the system may identify natural breaking points of the script and may break the graphs into these different time frames. Additionally, each graph may represent different time frames. For example, the first graph may represent 10 minutes, while the second graph represents 30 minutes.

In an embodiment, the generation of multiple graphs may be conducted dynamically. In an embodiment, a system may dynamically generate a new graph when it has determined (e.g., through semantic analysis) that a change in relationship between two characters has occurred. For example, a sixty minute movie may be divided into sixty, one minute segments. For each of these segments, the corresponding script is analyzed and a graph may be generated. If there is no change in the relationship profile from one segment to another (e.g., from minute one to minute two), then the graphs may be collated into a single graph (e.g., graph two merged into graph one). When the system determines that the dialogue between characters indicates a relationship change, then the graph from the segment corresponding to the relationship change is not collated into the existing graph, but rather, stands alone as a new graph. This process may be repeated until all of the segments have been analyzed and an N number of graphs have been generated, where each graph corresponds to a new relationship situation.

In an embodiment, a script corresponding to a production may be automatically segmented into different sections that are distinct from each other based upon various predetermined factors. In an embodiment, the predetermined factors may include the relationships between the main characters (e.g., labels and the weight change on the edges), entry/exit of important characters (e.g., node addition/removal), and interaction shift (e.g., edge addition/deletion). In an embodiment, the evolving relationships between the characters in a narrative may be identified and aggregated. In an embodiment, communities comprising a plurality of characters in the narrative may be created based upon the dialogue interactions between the characters.

In an embodiment, after the graphs are generated, the evolving interrelationships between the characters may be visualized by comparing the graphs to one another. For example, in an embodiment, all of the graphs may be placed on a single page for viewing. In another embodiment, a mechanism (e.g., a slider, selection arrows, time bar, etc.) may be used to cycle through the graphs. For example, as a user moves the slider along the bar, the graph may change to illustrate the relationships and characters at that point in time. In an embodiment, differences in the relationship labels between graphs may be highlighted for the users. In an embodiment, when the graphs are generated based upon a relationship profile, characters whose emotions or personalities that have changed throughout the narrative may appear in different groups across the graphs.

Figure 5:
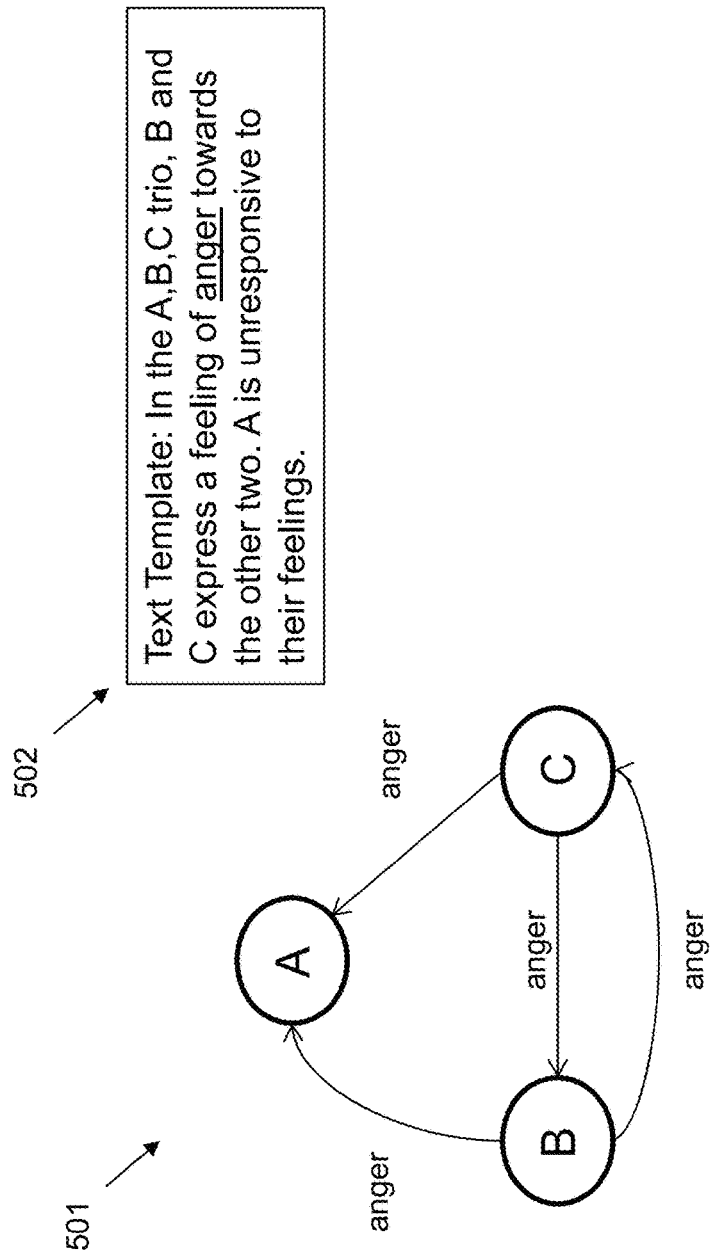
FIG. 5 illustrates an example mined diagram and corresponding text template.

In an embodiment, the generated graphs may be further analyzed to determine various additional structures and sub-structures. In an embodiment, the mining may be able to identify basic complexity metrics (e.g., number of nodes, number of edges, edge density of movie, etc.), who the primary characters are in the movie (e.g., based on hub-like structures, etc.), brokerage relationships (e.g., the brokerage role played by characters between two or more characters, etc.), structural hole relationships (e.g., characters playing structural hole roles in the movie, etc.), and the like. In an embodiment, the mining may also produce diagrams 501 that focus on smaller portions of the overall graph. In an embodiment, text templates 502 may be generated that correspond to the diagrams and describe the relationships between the characters in the diagram. The text templates 502 may be generated from the diagrams 501. In an embodiment, the text templates 502 may be positioned in proximity to the corresponding diagram 501. For example, as shown in FIG. 5, a mined diagram 501 may focus on the relationships between characters A, B, and C at a specific point of a narrative. The text template 502 may describe the interrelationship of the trio at that point.

In an embodiment, new script metrics may be defined by using graph theoretic measures such as the complexity of the script (e.g., number of vertices, edges, density, etc.), the dynamicity of the script (e.g., how many times do the relationships change), and the speed of the dynamicity (e.g., the time frame in which these changes occur).

Figure 6:
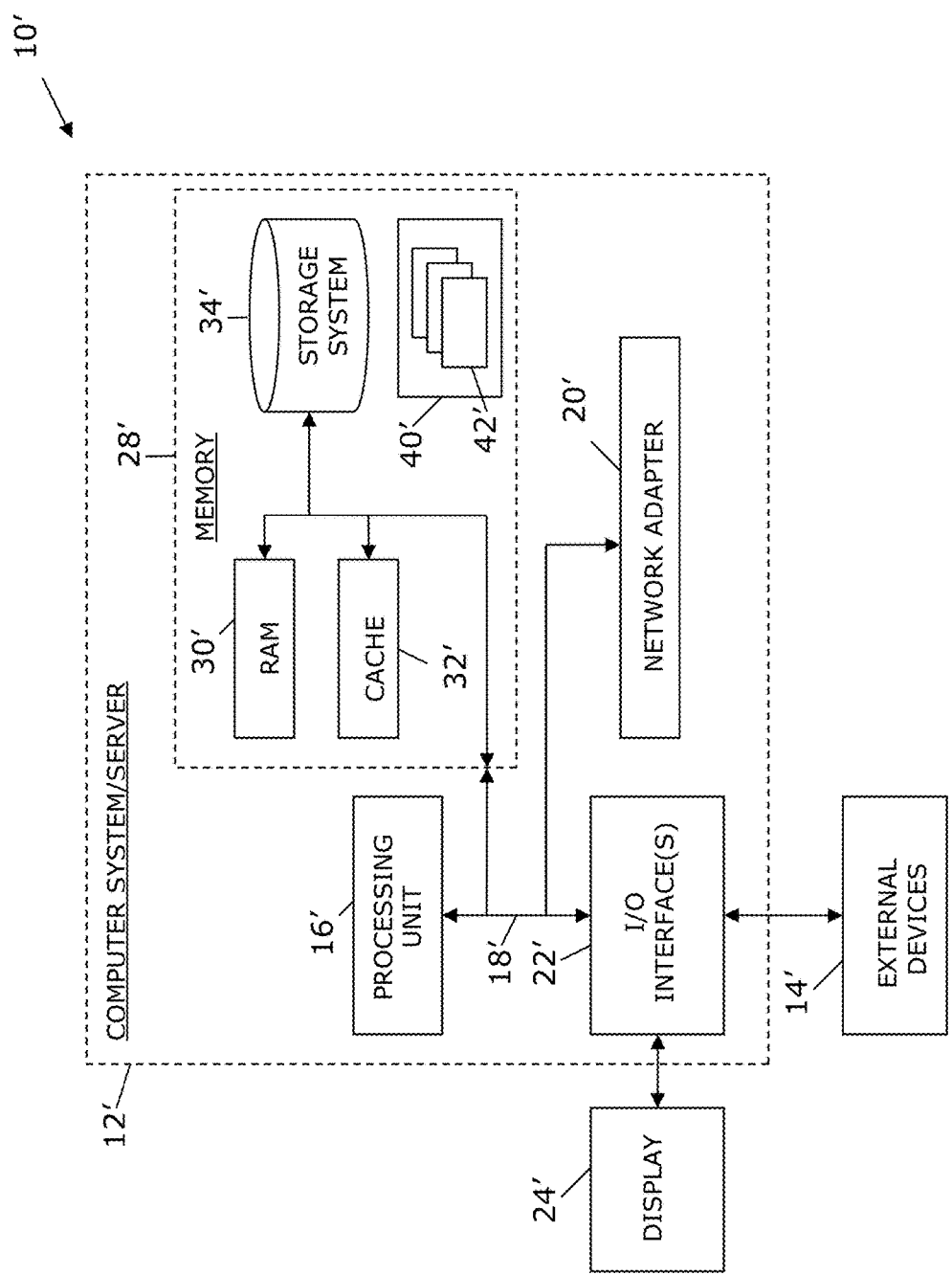
FIG. 6 illustrates a computer system.

As shown in FIG. 6, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing a processor to execute computer code that performs the steps of:
receiving, at an information handling device, a dataset comprising dialogue information between a plurality of characters in a narrative;
analyzing, using text parsers and semantic analysis tools, the dataset to identify dialogue patterns between the plurality of characters, wherein the analyzing comprises utilizing the text parsers to identify character names and dialogue exchanged between the plurality of characters and utilizing the semantic analysis tools to identify one or more of: tone, conversation style, and syntax, of the dialogue;
determining, based upon the identified dialogue patterns, at least one relationship profile between at least a subset of the plurality of characters;
generating, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters, wherein the at least one graph comprises a plurality of graphs and wherein each of the plurality of graphs corresponds to a predefined time frame of the dataset;

analyzing the plurality of graphs to determine an evolution of a relationship profile between the subset of the plurality of characters over the predetermined time frame;

providing a visual representation of the evolution, wherein the visual representation comprises a mechanism for advancing through the evolution; and highlighting, between one of the plurality of graphs and another of the plurality of graphs in the evolution, the differences in the relationship between at least two of the plurality of characters.

2. The method of claim 1, wherein the dataset comprises a script.

3. The method of claim 1, wherein each of the plurality of edges comprises a corresponding thickness, wherein the thickness identifies a dialogue density between two characters connected by the corresponding edge.

4. The method of claim 1, wherein the at least one relationship profile is selected from the group consisting of: an emotional profile and a personality profile.

5. The method of claim 1, wherein the at least one graph comprises at least two different groups, wherein each group comprises nodes and edges having characteristics, obtained from the relationship profile, similar to other nodes and edges of the same group.

6. The method of claim 1, comprising analyzing the at least one graph to identify at least one diagram for a predetermined subset of the plurality of characters.

7. The method of claim 6, comprising generating at least one text template corresponding to the at least one diagram, wherein the at least one text template describes the relationship profile between the subset of the plurality of characters of the at least one diagram.

8. The method of claim 1, comprising temporal segmentation of the dataset into a plurality of sections, wherein each of the plurality of sections is distinct from another of the plurality of sections based upon a predetermined factor.

9. An apparatus, comprising:
at least one processor; and
a computer readable storage medium having computer readable program code embodied therewith and executable by the at least one processor, the computer readable program code comprising:
computer readable program code that receives a dataset comprising dialogue information between a plurality of characters in a narrative;
computer readable program code that analyzes, using text parsers and semantic analysis tools, the data-set to identify dialogue patterns between the plurality of characters, wherein the code that analyzes comprises code that utilizes the text parsers to identify character names and dialogue exchanged between the plurality of characters and code that utilizes the semantic analysis tools to identify one or more of: tone, conversation style, and syntax of the dialogue;
computer readable program code that determines, based on the identified dialogue patterns, at least one relationship profile between at least a subset of the plurality of characters;
computer readable program code that generates, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters, wherein the at least one graph comprises a plurality of graphs and wherein each of the plurality of graphs corresponds to a predefined time frame of the dataset;
computer readable program code that analyzes the plurality of graphs to determine an evolution of a relationship profile between the subset of the plurality of characters over the predetermined time frame;
computer readable program code that provides a visual representation of the evolution, wherein the visual representation comprises a mechanism for advancing through the evolution; and
computer readable program code that highlights, between one of the plurality of graphs and another of the plurality of graphs in the evolution, the differences in the relationship between at least two of the plurality of characters.

10. A computer program product, comprising:
a computer readable storage medium having computer readable program code embodied therewith, the computer readable program code executable by a processor and comprising:
computer readable program code that receives a dataset comprising dialogue information between a plurality of characters in a narrative;
computer readable program code that analyzes, using text parsers and semantic analysis tools, the data-set to identify dialogue patterns between the plurality of characters, wherein the code that analyzes comprises code that utilizes the text parsers to identify character names and dialogue exchanged between the plurality of characters and code that utilizes the semantic analysis tools to identify one or more of: tone, conversation style, and syntax of the dialogue;
computer readable program code that determines, based on the identified dialogue patterns, at least one relationship profile between at least a subset of the plurality of characters; and
computer readable program code that generates, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters, wherein the at least one graph comprises a plurality of graphs and wherein each of the plurality of graphs corresponds to a predefined time frame of the dataset;
computer readable program code that analyzes the plurality of graphs to determine an evolution of a relationship profile between the subset of the plurality of characters over the predetermined time frame;
computer readable program code that provides a visual representation of the evolution, wherein the visual representation comprises a mechanism for advancing through the evolution; and
computer readable program code that highlights, between one of the plurality of graphs and another of the plurality of graphs in the evolution, the differences in the relationship between at least two of the plurality of characters.

11. The computer program product of claim 10, wherein the data set comprises a script.

12. The computer program product of claim 10, wherein each of the plurality of edges comprises a corresponding thickness, wherein the thickness identifies a dialogue density between the two characters connected by the corresponding edge.

13. The computer program product of claim 10, wherein the at least one relationship profile is selected from the group consisting of: an emotional profile and a personality profile.

14. The computer program product of claim 10, wherein the at least on graph comprises at least two different groups, wherein each group comprises nodes and edges having characteristics, obtained from the relationship profile, similar to other nodes and edges of the same group.

15. A method, comprising:
  utilizing at least one processor to execute computer code that per forms the steps of:
  receiving, at an information handling device, a script comprising dialogue information between a plurality of characters in a narrative;
  analyzing, using text parsers and semantic analysis tools, the dataset to identify dialogue patterns between the plurality of characters, wherein the analyzing comprises utilizing the text parsers to identify character names and dialogue exchanged between the plurality of characters and utilizing the semantic analysis tools to identify one or more of: tone, conversation style, and syntax, of the dialogue;
  determining, based upon the identified dialogue patterns, at least one relationship profile between at least a subset of the plurality of characters, wherein the relationship profile is selected from the group consisting of an emotional profile and a personality profile;
  generating, based upon the at least one relationship profile, at least one graph comprising a plurality of edges and a plurality of nodes, wherein each of the plurality of nodes corresponds to one of the plurality of characters and wherein each of the plurality of edges corresponds to a relationship between two of the plurality of characters;
  wherein the at least one graph comprises at least two different groups, wherein each group comprises nodes and edges having characteristics, obtained from the relationship profile, similar to the other nodes and edges of the same group;
  wherein the at least one graph comprises a plurality of graphs and wherein each of the plurality of graphs corresponds to a predefined time frame of the dataset;
  analyzing the plurality of graphs to determine an evolution of a relationship profile between the subset of the plurality of characters over the predetermined time frame;
  providing a visual representation of the evolution, wherein the visual representation comprises a mechanism for advancing through the evolution; and
  highlighting, between one of the plurality of graphs and another of the plurality of graphs in the evolution, the differences in the relationship between at least two of the plurality of characters.

\* \* \* \* \*